United States Patent [19]
Ohta et al.

[11] Patent Number: 5,954,581
[45] Date of Patent: Sep. 21, 1999

[54] PSYCHOLOGICAL GAME DEVICE

[75] Inventors: Yoshihiko Ohta; Yasuhiro Noguchi, both of Kobe, Japan

[73] Assignee: Konami Co., Ltd., Hyogo-ken, Japan

[21] Appl. No.: 08/762,018

[22] Filed: Dec. 11, 1996

[30] Foreign Application Priority Data

Dec. 15, 1996 [JP] Japan ................................. 7-327650

[51] Int. Cl.$^6$ ............................. A63B 9/24; G09B 19/00; G06F 17/27
[52] U.S. Cl. .............................................. 463/9; 434/236
[58] Field of Search ................................. 434/236–238, 434/323; 704/1–2, 9–10; 463/1, 9, 30, 36; 273/161, 429–432

[56] References Cited

U.S. PATENT DOCUMENTS

| | | | |
|---|---|---|---|
| 3,748,750 | 7/1973 | Viemeister | 434/236 |
| 4,627,818 | 12/1986 | Von Fellenberg | 434/236 |
| 4,846,693 | 7/1989 | Baer . | |
| 4,932,416 | 6/1990 | Rosenfeld . | |
| 5,312,114 | 5/1994 | Lipson . | |
| 5,676,551 | 10/1997 | Knight et al. | 434/236 |
| 5,696,981 | 12/1997 | Shovers | 434/236 |

FOREIGN PATENT DOCUMENTS

| | | |
|---|---|---|
| 2131749 | 5/1990 | Japan . |
| 7144065 | 6/1995 | Japan . |
| WO9000429 | 1/1990 | WIPO . |
| WO9004439 | 5/1990 | WIPO . |
| WO9117704 | 11/1991 | WIPO . |
| WO9427677 | 12/1994 | WIPO . |

*Primary Examiner*—Jessica J. Harrison
*Assistant Examiner*—Mark A Sager
*Attorney, Agent, or Firm*—Jordan and Hamburg LLP

[57] ABSTRACT

A plurality of questions and a plurality of alternative answers to each of the questions are stored in a ROM, and outputted to a display monitor for display. A psychological game player selects and inputs one of the alternative answers to each of the questions using operation switches. Depending on the selected answers, one of a plurality of scenarios stored in the ROM is selected by a scenario selector, and video data corresponding to the selected scenario are displayed on the display monitor. Audio data relative to the selected scenario are also outputted to headphones. A character type determined depending on the selected answers is also displayed on the display monitor.

11 Claims, 9 Drawing Sheets

YOUR FRIEND HAS LOST HIS WALLET WITH ALL HIS MONEY.
WHAT DO YOU WANT TO DO?
1. I WILL LEND HIM AS MUCH AS HE WANTS.
2. I WILL LEND HIM WHAT HE NEEDS FOR A WHILE.
3. I WILL BUY HIM SOME OF WHAT HE NEEDS.

FIG.5

YOU ARE OPERATING A SPACESHIP.
WHICH STAR OR PLANET ARE YOU HEADING FOR?
1. SUN
2. MARS
3. EARTH
4. URANUS

FIG.6

PSYCHOLOGICAL GAME DEVICE

BACKGROUND OF THE INVENTION

The present invention relates to a psychological game device for outputting one of different scenarios depending on answers given to questions by a player of the psychological game device.

There has heretofore been proposed a psychological diagnostic device for psychologically judging the adaptability or the like of a person in an adaptability diagnosis for occupational selection based on answers offered to questions by the person, as disclosed in Japanese laid-open patent publication No. 2-131749. The proposed psychological diagnostic device merely judges the character of the person who has answered the question, but does not operate to produce any effects whatsoever based on the character of the judged person.

There has also been proposed a horoscopic fortune-teller machine for telling fortunes of a player based on the player's entered data including the date of birth, place, etc. according to horoscopic principles and displaying the results on a display screen or printing the results on a recording sheet, as disclosed in Japanese laid-open patent publication No. 7-144065. The proposed horoscopic fortune-teller machine simply tells fortunes of a player based on the player's entered data.

SUMMARY OF THE INVENTION

It is therefore an object of the present invention to provide a psychological game device which is fun to use and is highly interesting to a player or players by producing one of different scenarios depending on alternative answers provided to questions by the player or players.

According to the present invention, there is provided a psychological game device comprising question and answer storage means for storing at least one question and a plurality of alternative answers to the question, question and answer output means for outputting the question and the alternative answers, answer input means for selecting and inputting one of the alternative answers outputted by the question and answer output means, scenario storage means for storing a plurality of scenarios associated respectively with a plurality of classifications related to the alternative answers, classification selecting means for selecting one of the classifications depending on the selected and inputted one of the alternative answers, and scenario output means for outputting one of the scenarios which is associated with the selected one of the classifications.

The question and the alternative answers thereto are outputted, and one of the alternative answers is selected and inputted by a player of the psychological game device. Depending on the inputted alternative answer, one of the classifications stored in the scenario storage means is selected, and one of the scenarios corresponding to the selected classification is outputted. Specifically, each of the scenarios has a different set of scenes, and video data or audio data or both relative to the scenario are outputted. The scenario storage means may comprise a CD-ROM, a hard disk, a floppy disk, a digital video disk, a semiconductor memory, a laser disk, an optical disk, or any of various other recording mediums capable of recording video and audio data. Consequently, depending on the alternative answer selected by the player, a different scenario is outputted to give a lot of fun to the player. One or plural questions may be stored in the question and answer storage means. If one question is stored in the question and answer storage means, then the alternative answer selected and inputted by the answer input means corresponds directly to the selected classification.

The question and answer storage means comprises means for storing a plurality of questions, and the question and answer output means comprises means for outputting a number of questions from the plurality of questions. The classification selecting means comprises weighting value storage means for storing predetermined weighting values associated respectively with the classifications with respect to each of the alternative answers, numeral storage means for storing numerals respectively with respect to the classifications, adding means for adding weighting values corresponding to the selected and inputted one of the alternative answers to the respective numerals stored respectively with respect to the classifications by the numeral storage means, and storing sum numerals respectively with respect to the classifications, and sum determining means for determining one of the classifications which is associated with a maximum sum numeral stored in the numeral storage means.

The weighting values associated respectively with the classifications with respect to each of the alternative answers are stored by the weighting value storage means. A number of questions from the plurality of questions are outputted, and when alternative answers to the respective questions are selected and inputted by the player, those weight values which correspond to the selected and inputted alternative answers are added in the respective classifications. One of the classifications which has a maximum sum numeral is determined, and a scenario corresponding to the determined classification is selected and outputted. Since one of the classifications is determined using the weighting values which the player does not know, the classification can be determined objectively without being affected by any intention of the player.

The classifications comprise respective character types for human beings, the questions and the alternative answers which are stored in the question and answer storage means are established to determine the character types, and the weighting values are established in association with the character types, respectively.

The scenarios are generated in associated with the respective character types, and the questions and the alternative answers are established to determine the character types. Since a scenario corresponding to the character type of the player is outputted, the player is highly interested in the psychological game played by the psychological game device.

The psychological game device further comprises character type determining means for determining a character type of a player who plays the psychological game device based on the sum numerals stored respectively with respect to the classifications by the adding means, and printing means for printing the determined character type on a recording sheet and outputting the recording sheet.

The character type of the player is determined based on the sum numerals stored respectively with respect to the classifications, and the determined character type is printed and outputted. The player who reads the printed character type clearly recognize the determined character type, and finds the psychological game highly interesting. The player may bring back the recording sheet on which the character type is printed.

The psychological game device further comprises second question and answer storage means for storing a second question to accompany each of the scenarios and a plurality of second alternative answers to the second question, each of the scenarios having scenes, selectable one at a time, in a latter half thereof which correspond respectively to the second alternative answers, the question and answer output means comprising means for outputting the second question and the second alternative answers after one of the classifications is selected by the classification selecting means, the answer input means comprising means for selecting and inputting one of the second alternative answers outputted by the question and answer output means, the classification selecting means comprising changing means for selecting one of the scenes depending on the selected one of the second alternative answers. This arrangement allows the player to find the psychological game much more interesting.

The scenario storage means comprises video and audio data storage means for storing video data and audio data which are generated in association with each of the scenarios, and the scenario output means comprises video display means for displaying the video data and two-channel audio output means for outputting the audio data in a stereophonic mode. The displayed video data and the stereophonic audio data make the psychological game highly interesting to the player.

According to the present invention, there is also provide a psychological game device comprising means for storing a plurality of questions and a plurality of alternative answers to each of the questions, means for displaying the questions and the alternative answers to each of the questions, means, operable by a psychological game player, for inputting one of the alternative answers which is selected by the psychological game player to each of the questions, means for selecting one of a plurality of character types depending on the one of the alternative answers which is inputted to each of the questions, means for storing a plurality of scenarios associated respectively with the character types, and means for displaying the selected one of the character types and one of the stored scenarios which is associated with the selected one of the character types.

The psychological game device further comprises means for printing the selected one of the character types.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 5 and 6 are views of images displayed on a display monitor, each showing a question and a choice of alternative questions by way of example;

DETAILED DESCRIPTION OF THE PREFERRED EMBODIMENT

Figure 1:
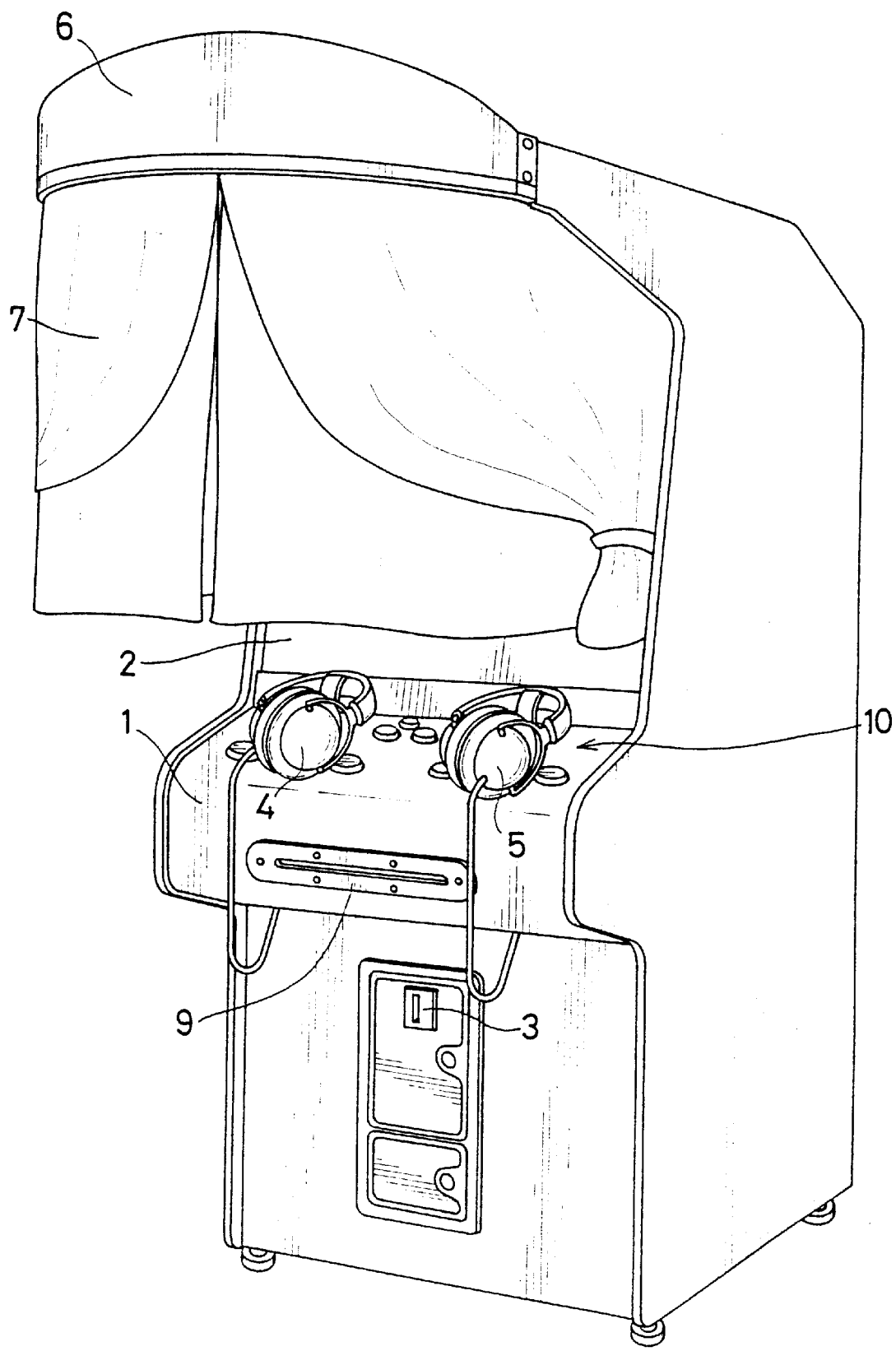
FIG. 1 is a perspective view of a psychological game device according to the present invention.
Figure 2:
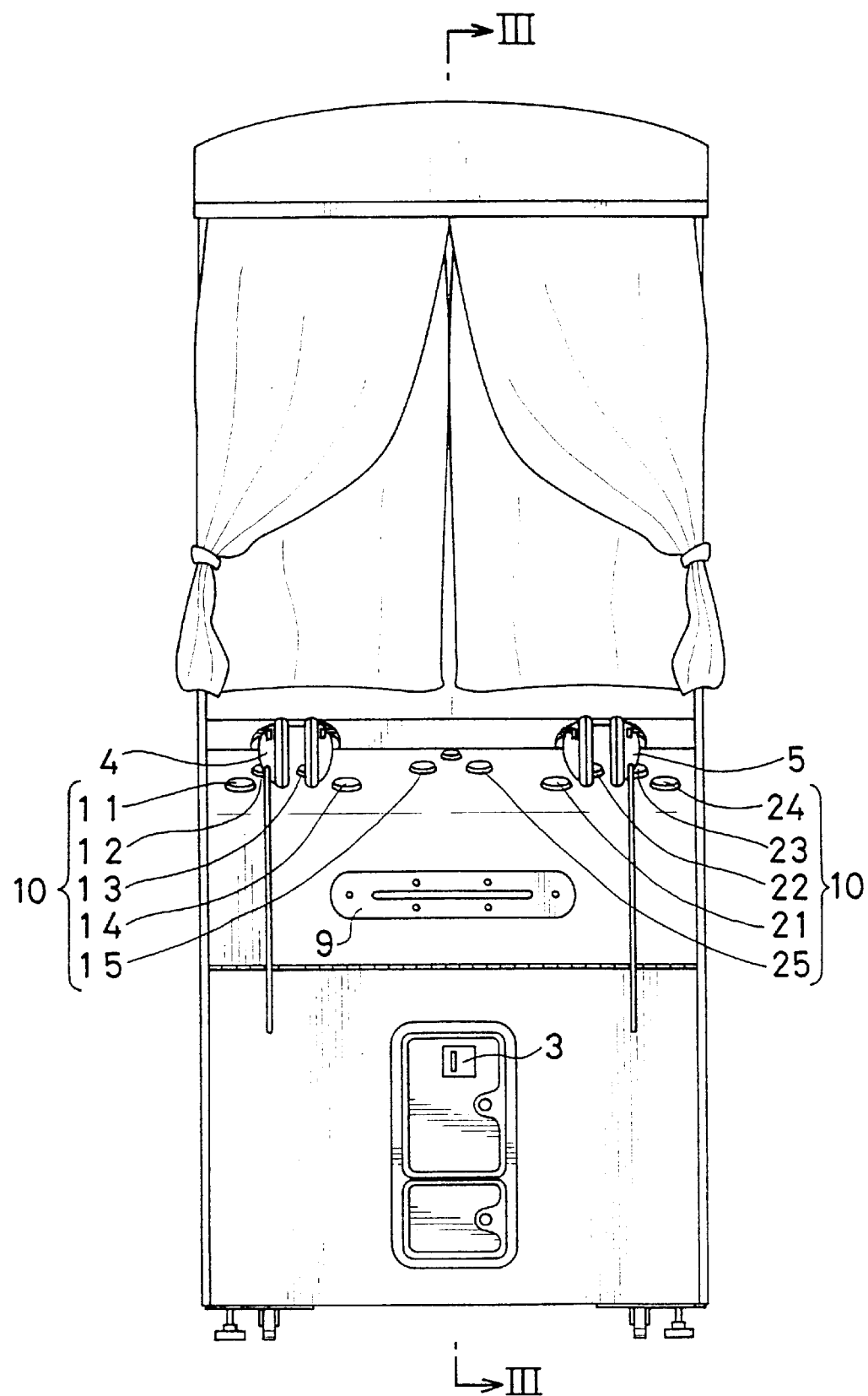
FIG. 2 is a front elevational view of the psychological game device shown in FIG. 1.
Figure 3:
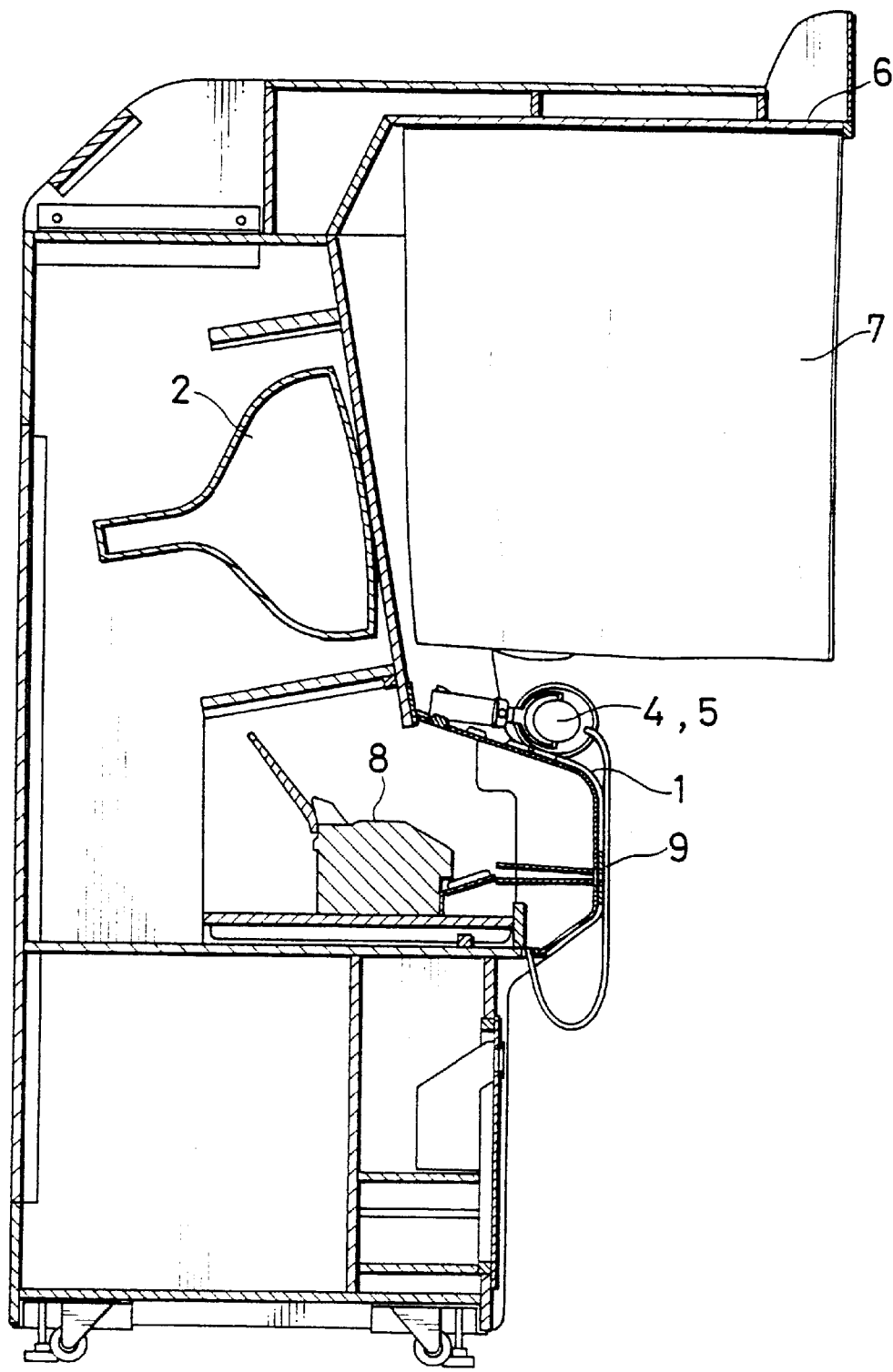
FIG. 3 is a cross-sectional view taken along line III—III of FIG. 2.

FIGS. 1 through 3 show structural details of a psychological game device according to the present invention.

As shown in FIG. 1, the psychological game device basically has a vertically elongate, upstanding structure for standing players to play a psychological game on the psychological game device. The psychological game device includes a housing 1 projecting forward from a substantially vertically central portion of the upstanding structure, a display monitor 2 comprising a cathode-ray tube (CRT) disposed above the housing 1, a coin insertion slot 3 positioned below the housing 1, and a pair of headphones 4, 5 placed on the housing 1 for players to wear on their heads. The psychological game device also has a ceiling panel 6 projecting forward from the upper end of the upstanding structure in overhanging relation to the display monitor 2. Players who play the psychological game device are shielded by a curtain 7 which hangs from and extends along a front edge of the ceiling panel 6.

As shown in FIG. 3, a printer 8 is disposed in the housing 1. A recording sheet, printed by the printer 8, is discharged through a sheet outlet 9 (see also FIGS. 1 and 2) which is defined in a front panel of the housing 1. As shown in FIGS. 1 and 2, the housing 1 has an operation console 10 on its upper panel which is operated by players.

As shown in FIG. 2, the operation console 10 has a set of operation switches 11, 12, 13, 14 positioned in a left-hand region of the upper panel of the housing 1, another set of operation switches 21, 22, 23, 24 positioned in a right-hand region of the upper panel of the housing 1, a start switch 15 positioned in a left-hand central region of the upper panel of the housing 1, and another start switch 25 positioned in a right-hand central region of the upper panel of the housing 1. The set of operation switches 11, 12, 13, 14 and the start switch 15 are operated by a player, and the set of operation switches 21, 22, 23, 24 and the start switch 25 are operated by another player. Therefore, the psychological game device can be played by two players at the same time.

Figure 4:
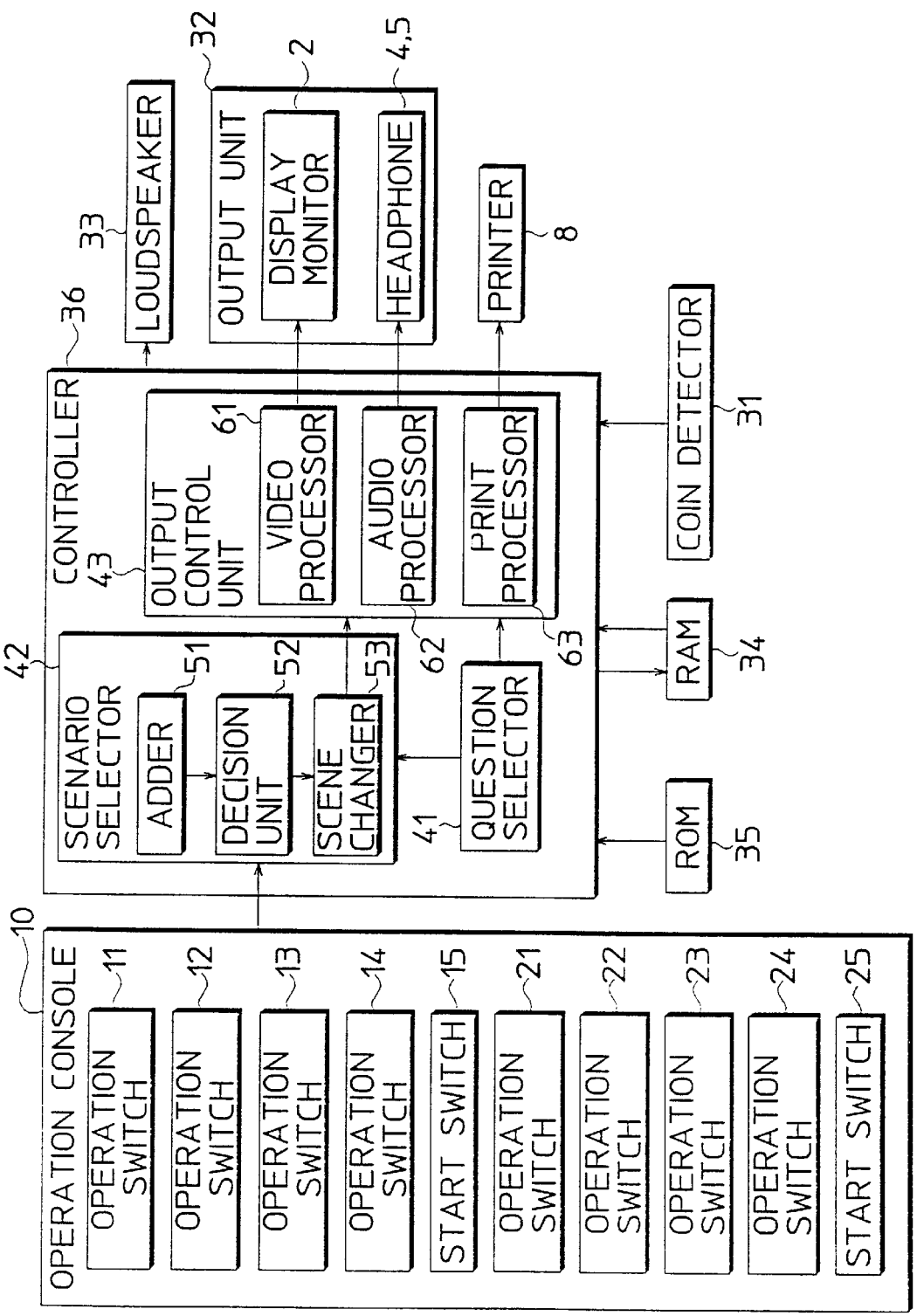
FIG. 4 is a block diagram of a control system of the psychological game device.

FIG. 4 shows in block form a control system of the psychological game device.

As shown in FIG. 4, the control system includes the operation console 10, the printer 8, a coin detector 31, an output unit 32 which comprises the display monitor 2 and the headphones 4, 5, a loudspeaker 33, a RAM (random-access memory) 34, a ROM (read-only memory) 35, and a controller 36.

When each of the switches of the operation console 10 is pressed, a switch signal generated thereby is supplied to the controller 36. The coin detector 31 serves to detect a coin inserted into the coin insertion slot 2 (see FIG. 1). A detected signal which is produced by the coin detector 31 and indicative of an inserted coin is supplied to the controller 36. The RAM 34 serves to temporarily store data and calculated results as described below.

The ROM 35 comprises a CD-ROM, and stores a psychological game program run by the psychological game device. The ROM 35 also stores the following data:

1) 300 questions which are divided into three groups each comprising 100 questions;
2) 4 alternative answers to each of the above 300 questions;
3) Video data of actual images and audio data which are generated with respect to 10 scenarios that are associated with respective different character types;
4) 10 questions produced in association with the respective scenarios;
5) 3 alternative answers to each of the above 10 questions;
6) Video data of actual images and audio data which are generated with respect to three scenes, produced for the 3 alternative answers, in a latter half of each of the scenarios;
7) A character weighting table (given as Table 1 below); and
8) Print data with respect to descriptions of characters produced for the character types, descriptions of advisements to players and the scenarios, etc.

The questions and the alternative answers represented by the above data 1), 2), 4), 5) are designed as a psychological test for determining the character type of a player which is characterized by aggressiveness, sexual desire, etc. FIGS. 5 and 6 show by way of example images displayed on the display monitor 2, each showing a question and a choice of alternative answers to the question.

The 10 scenarios represented by the above data 3) are generated about respective persons of different character types. The three scenes represented by the above data 6) in a latter half of each of the scenarios are selected, one a time, depending on the character type indicated by each of the three alternative answers. As a player is judge for his or her character type by the above psychological test, the player sees video images displayed on the display monitor 2 about a person whose has the same character as the player.

TABLE 1

| | | Character types | | | | | | | | | |
|---|---|---|---|---|---|---|---|---|---|---|---|
| Qs | As | 1 | 2 | 3 | 4 | 5 | 6 | 7 | 8 | 9 | 10 |
| 1 | 1 | 0 | 0 | 1 | 2 | 0 | 3 | −3 | −2 | −1 | −3 |
|  | 2 | 1 | 3 | −3 | −2 | −1 | −3 | 2 | 0 | 1 | 0 |
|  | 3 | 1 | 0 | 3 | 0 | 2 | −1 | −3 | −1 | −2 | 0 |
|  | 4 | −2 | −3 | −1 | 0 | 0 | 1 | 0 | 3 | 0 | 2 |
| 2 | 1 | −3 | −1 | −2 | 0 | −2 | 0 | 0 | 3 | 2 | 1 |
|  | 2 | 0 | 0 | 0 | −3 | −1 | −2 | 3 | 1 | 1 | 0 |
|  | 3 | 1 | 2 | 3 | 0 | 0 | 0 | −1 | 0 | −3 | −2 |
|  | 4 | −1 | −2 | −3 | 1 | 3 | 2 | 0 | 0 | 0 | 0 |
| 300 | 1 | 0 | 0 | 3 | 1 | 2 | 0 | 0 | −3 | −2 | −1 |
|  | 2 | 0 | −3 | −1 | 0 | 0 | 2 | 3 | 0 | 0 | 0 |
|  | 3 | −3 | 0 | 0 | −2 | 0 | 0 | 0 | 1 | 3 | 2 |
|  | 4 | 3 | 2 | 0 | 0 | −3 | −1 | −2 | 0 | 0 | 0 |

Table 1, shown above, is part of the character measuring table which comprises weighting values established with respect to the 10 character types for each of the alternative answers represented by the above data 2). The character weighting table shows how a certain answer is related to the character types using weighting values.

The video data referred to above are recorded in the ROM 25 according to the Moving JPEG (joint photographic experts group) process by which frames of still image data are compressed by JPEG standards. The audio data referred to above are converted from analog data into digital data and recorded according to the CD format.

The controller 36 comprises a central processing unit (CPU), a logic circuit, or the like, and serves to control operation of the psychological game device. When the psychological game device is not played by players, the controller 36 controls the display monitor 2 to display demonstration images and also controls the loudspeaker 33 to produce demonstration sounds. The controller 36 also determines whether a coin is inserted into the coin insertion slot 3 (see FIG. 1) or not based on a detected signal from the coin detector 31, and determines whether each of the switches of the operation console 10 is pressed or not based on switch signals from the operation console 10.

As shown in FIG. 4, the controller 36 has a question selector 41, a scenario selector 42, and an output control unit 43. The question selector 41 randomly selects three questions, each from one of the groups of 100 questions stored in the ROM 35, for presentation to a player.

The scenario selector 42 has an adder 51, a decision unit 52, and a scene changer 53. As described later on, the adder 51 and the decision unit 52 determine the character type of a player depending on answers selected by the player to the three questions, and selects a scenario corresponding to the determined character type. The scene changer 53 changes scenes of a latter half of the selected scenario depending on an answer selected by the player to a question which accompanies the selected scenario.

The output control unit 43 has a video processor 61, an audio processor 62, and a print processor 63, for controlling operation of the output unit 32 and the printer 8.

The video processor 61 and the audio processor 62 read questions selected by the question selector 41 and alternative answers to the selected questions from the ROM 35, display the questions and the alternative answers on the display monitor 2, and output corresponding voice signals to the headphones 4, 5. The video processor 61 and the audio processor 62 also read video and audio data corresponding to a scenario selected by the scenario selector 42 from the ROM 35, and output the video and audio data to the display monitor 2 and the headphones 4, 5. The audio processor 62 has a digital-to-analog (D/A) converter for playing back CDs, and output audio data converted by the D/A converter to the headphones 4, 5.

After video data are outputted to the display monitor 2, the print processor 63 reads a description of the character of a player depending on the character type determined by the adder 51 and the decision unit 52 of the scenario selector 42, advice for future conduct, a description of a displayed scenario, and, if there are two players simultaneously playing the psychological game device, an affinity for each other, from the ROM 35, and prints them on a recording sheet with the printer 8.

The audio data stored in the ROM 35 are represented by monaural audio signals divided into two channels, one or both of which have been inverted or delayed depending on the frequency according to a known process, so that the audio data can produce a stereophonic sound effect when reproduced by the headphones 4, 5. The audio data may alternatively be inverted or delayed depending on the frequency by the audio processor 62 before being outputted to the headphones 4, 5.

Operation of the psychological game device will be described below with reference to FIGS. 7 through 11.

Figure 7:
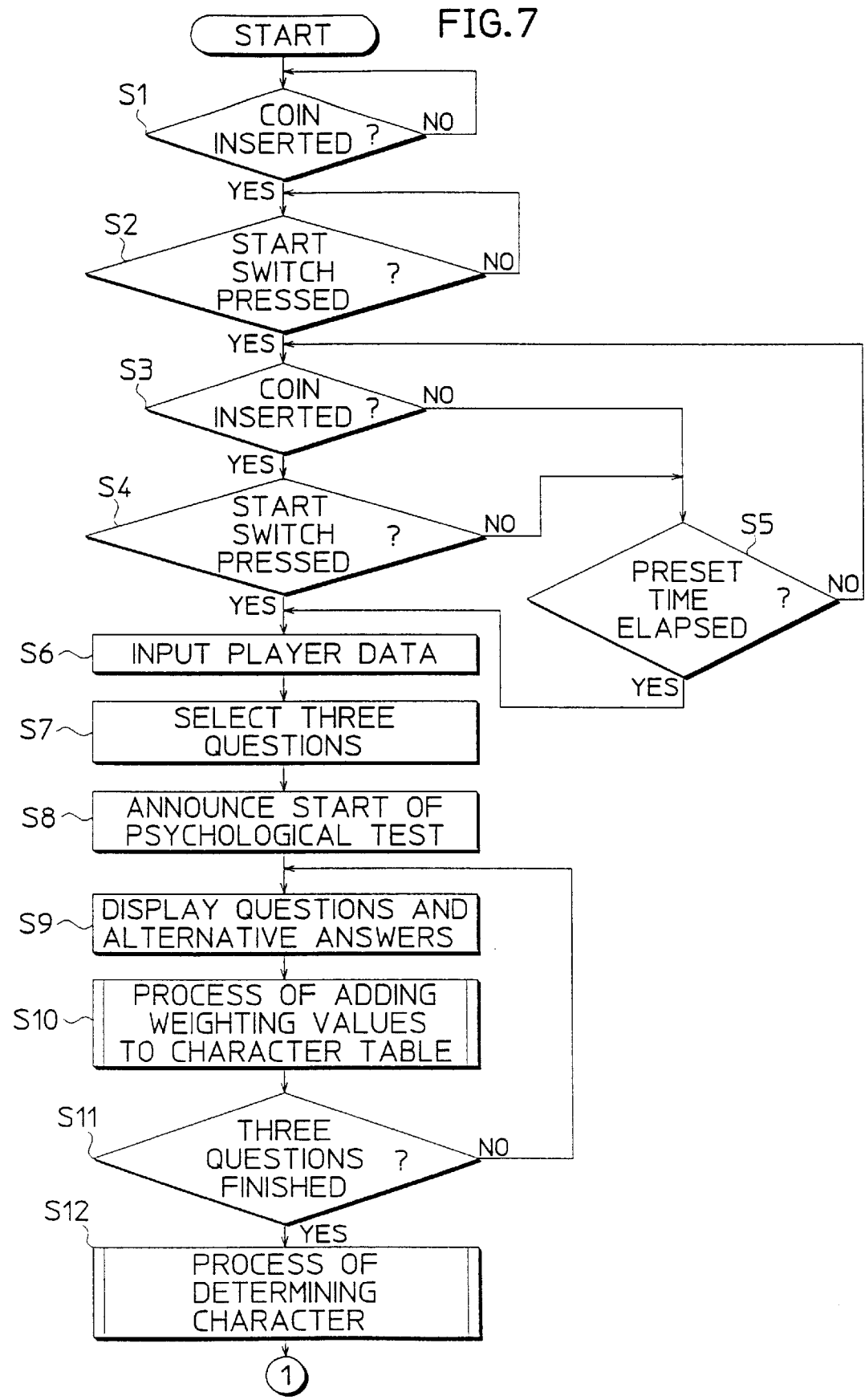
FIGS. 7 and 8 are a flowchart of a main routine of an operation sequence of the psychological game device.
Figure 8:
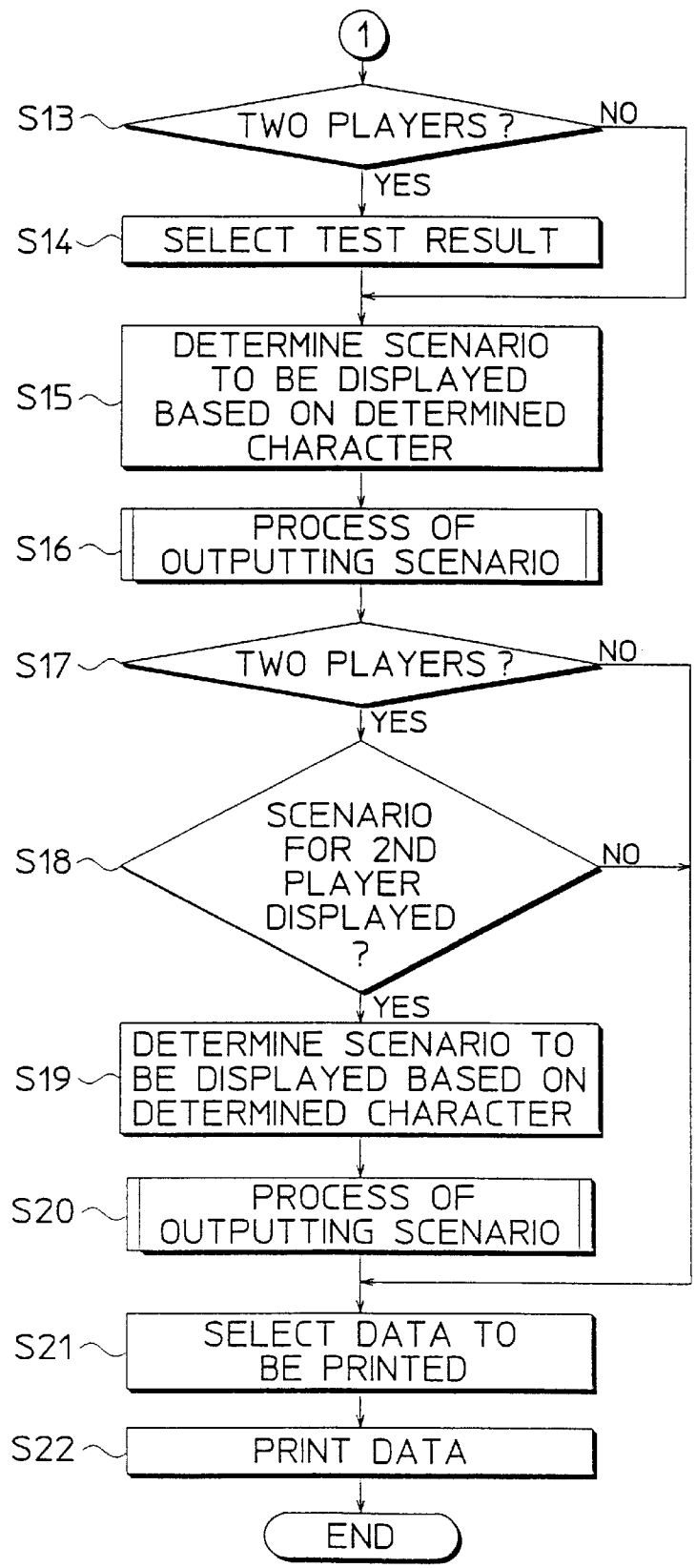
Figure 9:
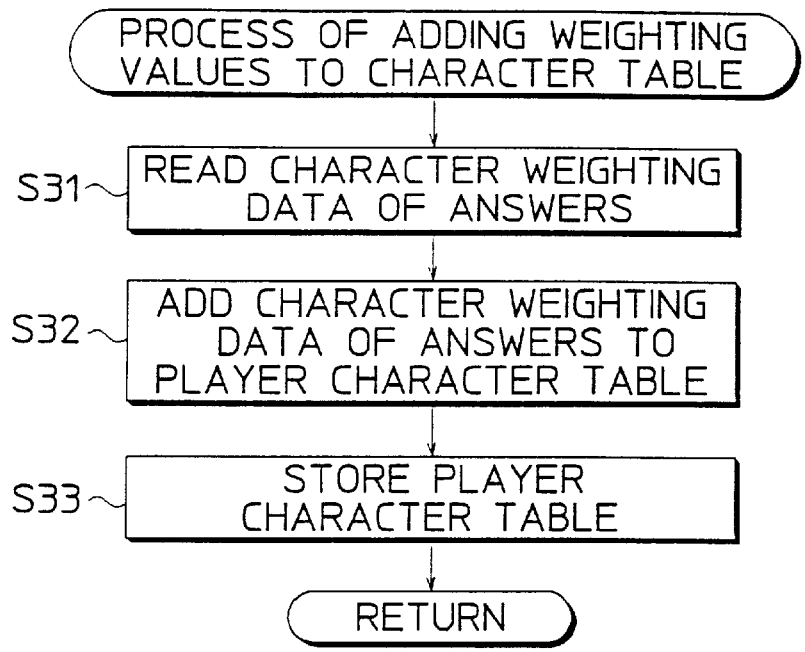
FIG. 9 is a flowchart of a subroutine of a process of adding weighting data to a player character table in the operation sequence shown in FIG. 7.
Figure 10:
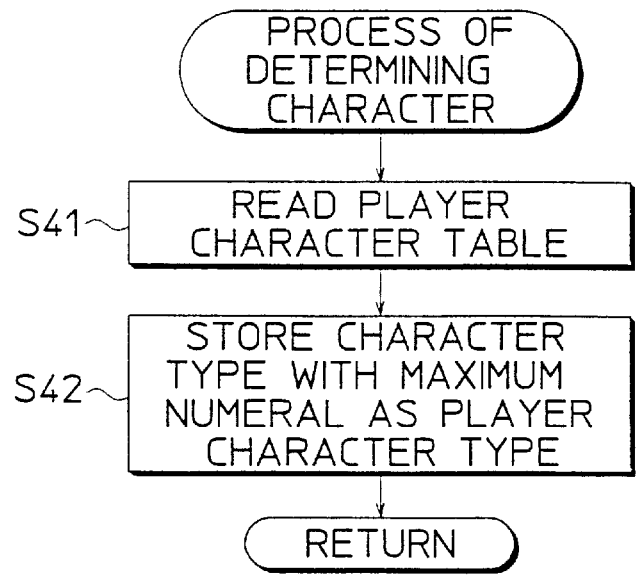
FIG. 10 is a flowchart of a subroutine of a process of determining a character in the operation sequence shown in FIG. 7.
Figure 11:
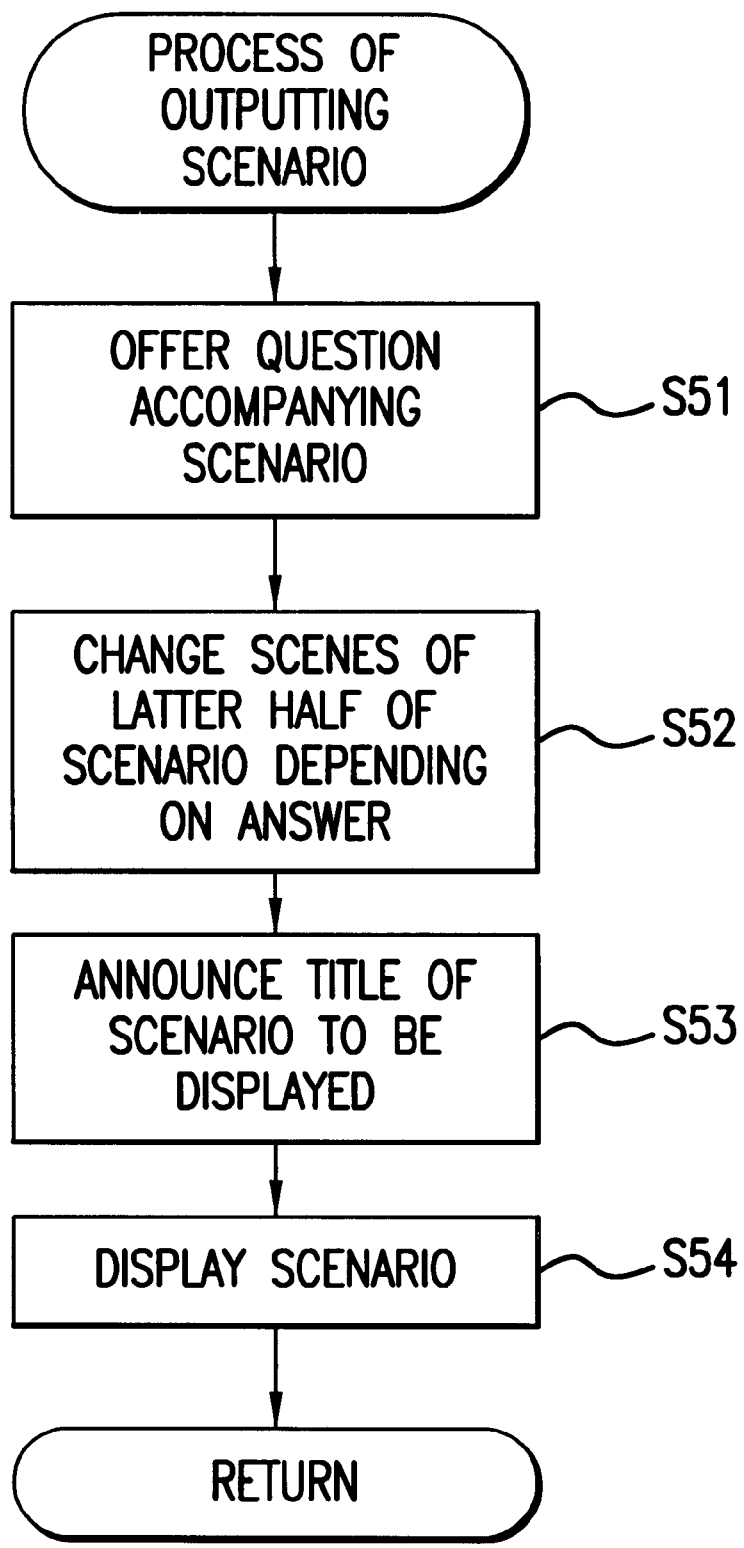
FIG. 11 is a flowchart of a subroutine of a process of outputting a scenario in the operation sequence shown in FIG. 8.

FIGS. 7 and 8 show a main routine of an operation sequence of the psychological game device, and FIGS. 9 through 11 show subroutines of the operation sequence of the psychological game device.

A psychological game played on the psychological game device by a player or players carries out a psychological test, in its former part, to determine the character of the player or players, and displays, in its latter part, a video image depending on the determined character.

As shown in FIG. 7, it is determined whether a coin is inserted or not in a step S1. If a coin is inserted ("YES" in the step S1), then it is determined whether one of the start switches, e.g., the start switch 15, is pressed or not in a step S2. If pressed ("YES" in the step S2), then control proceeds to a step S3 to see if there is a second player or not.

In the step S3, it is determined whether another coin is inserted or not. If another coin is inserted ("YES" in the step S3), then it is determined whether either one of the start switches 15, 25 is pressed or not in a step S4. If pressed ("YES" in the step S4), then control proceeds to a step S6.

If no coin is inserted in the step S3 ("NO" in the step S3), then it is determined in a step S5 whether a predetermined time has elapsed or not from the time when the start switch was pressed in the step S2. If the predetermined time has not elapsed ("NO" in the step S5), then control goes back to the step S3. If the predetermined time has elapsed ("YES" in the step S5), then it is decided that there is no second player, and control proceeds to the step S6.

If no start switch is pressed in the step S4 ("NO" in the step S4), then control goes to the step S5 to determine whether the predetermined time has elapsed or not. the predetermined time has not elapsed ("NO" in the step S5), then control goes back to the step S3. Since a coin has already been inserted at this time ("YES" in the step S3), control proceeds to the step S4 to wait for the predetermined time to elapse. If the predetermined time has elapsed ("YES" in the step S5) with no start switch pressed, then it is decided that there is no second player, and control proceeds to the step S6.

In the step S6, data of the player or players, i.e., the initials, age, and sex of the player or players, are entered in the step S6. Specifically, the display monitor 2 displays a guidance message for the entrance of numerals and operations, and the player or players operate the operation switches 11~14, 21~24 according to the guidance message to enter the data. The player or players can move a cursor displayed on the display monitor 2 rightward with the operation switches 11, 21 and downward with the operation switches 12, 22, select a letter or numeral at the cursor with the operation switches 13, 23, and cancel a selected letter or numeral with the operation switches 14, 24.

Then, the question selector 41 randomly selects three questions, each from one of the groups of 100 questions, in a step S7. In a next step S8, the start of the psychological game is announced.

The selected three questions and alternative answers thereto are displayed on the display monitor 2 as shown in FIGS. 5 and 6 in a step S9. Then, a process of adding weighting data to a player character table, as described later on, is carried out in a step S10. A step S11 determines whether the three questions have been presented or not. If the three questions have not yet been presented ("NO" in the step S11), then control goes back to the step S9 to present a next one of the three questions. If the three questions have already been presented ("YES" in the step S11), then a process of determining a character, as described later on, is carried out in a step S12.

Thereafter, it is determined whether the psychological game device is played by one or two players in a step S13. If there is one player ("NO" in the step S13), then control jumps to a step S15. If there are two players ("YES" in the step S13), then the display monitor 2 displays a message prompting the players to select which one of psychological test results for the respective players is used to determine a scenario to be displayed in a step S14. Specifically, one of the psychological test results for the respective players can be selected by pressing any one of the operation switches 11~14 and the start switch 15 which are assigned to one of the players or any one of the operation switches 21~24 and the start switch 25 which are assigned to the other player.

Then, a scenario to be displayed is determined based on the character type of the selected player in the step S15. Thereafter, a process of outputting the determined scenario as described later on is carried out in a step S16.

In a next step S17, it is determined whether the psychological game device is played by one or two players. If there is one player ("NO" in the step S17), then control jumps to a step S21. If there are two players ("YES" in the step S17), then the display monitor 2 displays a message prompting the players to determine whether a scenario determined using the psychological test result for the second player is to be displayed or not in a step S18. If either one of the switches is pressed ("NO" in the step S18), then control jumps to the step S21. If a coin is inserted ("YES" in the step S18), then a scenario to be displayed is determined based on the character type of the second player in a step S19. Thereafter, a process of outputting the determined scenario is carried out in a step S20.

Then, data to be printed depending on the number of players and the determined character type or types are selected and read from the ROM 35 in the step S21, and delivered to the printer 8 and printed on a recording sheet in a step S22. The main routine shown in FIGS. 7 and 8 now comes to an end.

FIG. 9 shows a subroutine which represents the process of adding weighting data to a player character table in the step S10 of the operation sequence shown in FIG. 7.

As shown in FIG. 9, the character weighting table indicated by Table 1 above which is stored in the ROM 35 is referred to, and character weighting data of answers offered by the player to the three questions selected in the step S7 are read from the character weighting table in a step S31. Depending on the answers offered by the player, i.e., alternatives selected by the player, weighting data with respect to character types determined by the respective answers are added to a player character table given as Table 2 below in a step S32. The player character table to which the weighting data have been added is then stored in the RAM 34 in a step S33.

TABLE 2

| Character type | | | | | | | | | |
|---|---|---|---|---|---|---|---|---|---|
| 1 | 2 | 3 | 4 | 5 | 6 | 7 | 8 | 9 | 10 |
| 0 | 0 | 0 | 0 | 0 | 0 | 0 | 0 | 0 | 0 |

The alternative answers 1~4 shown for example in FIGS. 5 and 6 can be selected respectively by the operation switches 11~14 or the operation switches 21~24. If there are two players simultaneously playing the psychological game device, then the players can select respective alternative answers 1~4 respectively with the operation switches 11~14 and the operation switches 21~24.

FIG. 10 shows a subroutine which represents the process of determining a character in the step S12 of the operation sequence shown in FIG. 7.

As shown in FIG. 10, the player character table which has been stored in the RAM 34 according to the subroutine shown in FIG. 9 is read in a step S41. Then, a character type which has a maximum value is determined as the character type of the player and stored in the RAM 34 in a step S42. If the there are two players simultaneously playing the psychological game device, then character types of the respective players are determined and stored in the RAM 34.

FIG. 11 shows a subroutine which represents the process of outputting the determined scenario in each of the steps S16, S20 in the operation sequence shown in FIG. 4.

As shown in FIG. 11, a question which is made to accompany the determined scenario is offered in a step S51. For example, the display monitor 2 displays a scene in which a card game is being played with a man in a forest, and a question to ask which color card will be drawn by the man and alternative answers of respective three colors are offered to accompany the scene. Depending on the answer provided by the player, i.e., the color selected by the player, the scene changer 53 changes scenes in a latter half of the determined scenario to be displayed in a step S52. Then, the title of the determined scenario to be displayed is announced in a step S53. Image data of the determined scenario are then outputted to the display monitor 2 for display, and stereophonic sound data of the scenario are outputted to the headphones 4, 5 in a step 54. The scenario now starts its scene following the answer made by the player to the question in the step S51. In the above example, the image of the scenario begins with the color card which has been drawn by the man.

As described above, the psychological game device according to the present invention conducts a psychological test to determine the character type of a player or players and displays a scenario about a person who has the determined character type. Therefore, the player or players have a lot of fun and are highly interested in the psychological game played on the psychological game device.

The psychological game device according to the present invention is not limited to the illustrated embodiment, but may be modified as follows:

(1) The weighting values in the character weighting table represented by Table 1 may be 0 and positive values only. For example, the weighting values −3~+3 may be converted to 0~6 with 3 as a neutral value. These weighting values allow the CPU of the controller 36 to carry out calculations such as additions.

(2) The numbers of scenarios, questions, and alternative answers are not limited to the illustrated numbers, but may be selected as desired.

(3) The psychological game device may be combined with players' seats having respective vibration units for vibrating the player's seats depending on a displayed image to give players a physical sensation that is synchronized somehow to the displayed image. In this manner, the psychological game device can display images or movies which can be experienced with a feeling of reality by players.

(4) The psychological game device may output images or sounds only, and may be devoid of the printer 8 so as not to output printed recording sheets. The psychological game device thus modified is simpler in structure.

(5) The ROM 35 may comprise a hard disk, a floppy disk, a digital video disk, a semiconductor memory, a laser disk, an optical disk, or any of various other recording mediums capable of recording video and audio data, rather than the CD-ROM.

If the ROM 35 comprises an analog recording medium such as a laser disk or the like, then an NTSC signal may be recorded directly as video data on the ROM 35. If the ROM 35 comprises a digital recording medium such as a hard disk or the like, then video data may be recorded on the ROM 35 without being compressed in frames, or may be recorded on the ROM 35 as digital data compressed according to a moving image compression technique such as MPEG (moving picture experts group) standards, AVI format, or the like. If the CPU of the controller 36 has a high processing speed, then polygon data may be recorded directly as video data on the ROM 35.

Although a certain preferred embodiment of the present invention has been shown and described in detail, it should be understood that various changes and modifications may be made therein without departing from the scope of the appended claims.

What is claimed is:

1. A psychological game device for classifying a character type of a player, comprising:

question and answer storage means for storing at least one question and alternative answers to each of said at least one question;

question and answer output means for outputting one of said at least one question and said alternative answers thereto;

answer input means for selecting and inputting one of said alternative answers outputted by said question and answer output means;

scenario storage means for storing scenarios which are in a form of audio data and image data and which are associated respectively with classifications related to said alternative answers;

classification selecting means for selecting one of said classifications based on the selected and inputted one of the alternative answers; and scenario output means for outputting an audiovisual output based on said audio data and said image data of one of said plurality of scenarios which is associated with the selected one of said classifications.

2. The psychological game device according to claim 1, wherein:

said at least one question stored in said question and answer storage means is a plurality of questions;

said question and answer output means includes means for outputting a number of questions from said plurality of questions; and said classification selecting means includes:

weighting value storage means for storing predetermined weighting values, associated respectively with said classifications, for each of said alternative answers;

character classification weight storage means for storing weighting values with respect to said classifications;

adding means for adding weighting values corresponding to the selected and inputted one of the alternative answers to respective weighting values stored with respect to said classifications in said character classification weight storage means, and storing sums thereof respectively in said character classification weight storage means; and sum determining means for selecting one of said classifications which is associated with a maximum sum of said sums of weight values stored in said character classification weight storage means.

3. The psychological game device according to claim 2, wherein said classifications respectively correspond to character types for human beings, said questions and said alternative answers which are stored in said question and answer storage means are established to determine said character types, and said weighting values are established in association with the character types, respectively.

4. The psychological game device according to claim 3, further comprising:

character type determining means for determining one of said character types corresponding to said selected one of said classifications having the maximum sum as a character type of a player who plays the psychological game device based on the sums stored with respect to said classifications by said adding means; and printing means for printing the determined character type on a recording sheet and outputting the recording sheet.

5. The psychological game device according to any one of claims 1 through 4, further comprising:

second question and answer storage means for storing a second question and a plurality of second alternative answers to said second question to accompany each of said scenarios;

each of said scenarios having a beginning portion scene and a plurality of ending portion scenes, said ending portion scenes corresponding respectively to said second alternative answers;

said question and answer output means comprising means for outputting said second question and said second alternative answers for accompanying said one of said plurality of scenarios associated with said selected one of said classifications;

said answer input means comprising means for selecting and inputting one of said second alternative answers outputted by said question and answer output means; and scene selecting means for selecting one of said plurality of ending portion scenes of said one of said plurality of scenarios corresponding to the selected one of said second alternative answers.

6. The psychological game device according to claim 2, wherein:

said classifications respectively correspond to character types for human beings, said questions and said alternative answers which are stored in said question and answer storage means are established to determine said character types, and said weighting values are established in association with the character types, respectively; and output means for outputting one of said character types corresponding to said selected one of said classifications subsequent to said outputting of said audiovisual output to inform the player of their character type after viewing said audiovisual output.

7. The psychological game device according to claim 1, wherein said scenario output means comprises video display means for displaying said image data and two-channel audio output means for outputting said audio data in a stereophonic mode.

8. The psychological game device according to claim 1, wherein:

said classifications respectively correspond to character types for human beings, and said questions and said alternative answers which are stored in said question and answer storage means are established to determine said character types; and output means for outputting one of said character types corresponding to said selected one of said classifications subsequent to said outputting of said audiovisual output to inform the player of their character type after viewing said audiovisual output.

9. A psychological game device for operation by a psychological game player and classifying a character type of the psychological game player, comprising:

means for storing a plurality of questions and a plurality of alternative answers to each of said questions;

means for displaying said questions and said alternative answers to each of said questions;

means for inputting one of said alternative answers in response to selective action by the psychological game player to each of said questions;

means for selecting one of a plurality of character types depending on said one of the alternative answers which is inputted to each of said questions;

means for storing a plurality of scenarios associated respectively with said character types, said scenarios being in a form of image data and audio data; and means for displaying the selected one of the character types and an audiovisual presentation based on one of the stored scenarios which is associated with said selected one of the character types.

10. The psychological game device according to claim 9, further comprising means for printing said selected one of the character types.

11. The psychological game device according to claim 9, wherein said means for displaying displays the selected one of the character types subsequent to displaying said audiovisual presentation to inform the psychological game player of their character type after viewing said audiovisual presentation.

* * * * *

UNITED STATES PATENT AND TRADEMARK OFFICE
CERTIFICATE OF CORRECTION

PATENT NO. : 5,954,581
DATED : September 21, 1999
INVENTOR(S) : Yoshihiko OHTA et al.

It is certified that error appears in the above-identified patent and that said Letters Patent is hereby corrected as shown below:

On the title page of the Patent, left column, in the line following "[30] Foreign Application Priority Data", change "Dec. 15, 1996" to --Dec. 15, 1995--.

Signed and Sealed this

Second Day of May, 2000

Attest:

Q. TODD DICKINSON

*Attesting Officer*     *Director of Patents and Trademarks*